April 21, 1959 — O. O. AKERLUND — 2,883,651
VARIABLE MONITORING SYSTEM
Filed March 5, 1958 — 2 Sheets-Sheet 1

INVENTOR.
Oscar O. Akerlund
BY
Wallenstein & Spangenberg
attys.

April 21, 1959     O. O. AKERLUND     2,883,651
VARIABLE MONITORING SYSTEM

Filed March 5, 1958     2 Sheets-Sheet 2

INVENTOR.
Oscar O. Akerlund
BY
Wallenstein & Spangenberg
Attys.

United States Patent Office 2,883,651
Patented Apr. 21, 1959

2,883,651

VARIABLE MONITORING SYSTEM

Oscar O. Akerlund, Arlington Heights, Ill., assignor to Panellit, Inc., Skokie, Ill., a corporation of Illinois Application March 5, 1958, Serial No. 719,324

18 Claims. (Cl. 340—213)

This invention relates to apparatus for monitoring variables, particularly where a large number of variables to be monitored are successively scanned by a condition checking means responsive to abnormal variables.

Often, means are provided for temporarily terminating the scanning operation when a new abnormal variable is scanned, so that relatively slow operating measuring and recording equipment can be put into operation to log the condition of the variable. In such event, an audible alarm is usually sounded to alert an operator. Also, in such cases it may be desirable to shut down the equipment whose variables are being monitored to protect the equipment involved from damage. The monitoring apparatus may then include automatic control apparatus for shutting down the equipment being monitored. In all of these instances, a false detection of an abnormal variable is wasteful of time and manpower. In the case where the shutdown of a significant part of a plant is involved, this waste of time and money could be exceedingly high. It is, accordingly, one of the principal objects of the present invention to provide a variable monitoring system which is designed to greatly reduce the possibility of false detection of abnormal variables relative to similar types of equipment heretofore available.

Variable monitoring systems commonly include an abnormal variable detector comparator circuit which compares a preset standard of voltage with a voltage obtained from the output of a primary condition-responsive means or transducer, such as a thermocouple, or a potentiometer controlled by a pressure of flow variable. The apparent value of the variable as determined from the voltage input to the detector comparator circuit is a function, not only of the condition of the variable itself, but of the condition of the input circuit to the detector. Thus, a defective transducer, a spurious noise impulse, or a switching transient are factors which affect the apparent condition of the variable sensed by the detector and, therefore, could cause a false alarm. Heretofore, where switching transients were significant, the detector comparator circuit was often disabled during each switching period until the transients decayed substantially to zero. This, however, substantially limited the speed at which the system could be operated. It is obviously, most desirable that the transducers be scanned at the highest possible rate, so that the largest number of variables can be monitored in a given time or, conversely, so that, for a fixed number of variables, the time between the scanning of each of the variables is minimized.

Accordingly, another one of the objects of the present invention is to provide a variable monitoring system utilizing a scanning rate which is appreciably higher than scanning rates previously used for a given level of switching transients. A related object of the present invention is to provide a variable monitoring system operated at a scanning rate wherein, although the time between the scanning of successive variables is such that switching transients are still significant, the system nevertheless operates reliably in indicating abnormal conditions of the variables.

Still another one of the objects of the present invention are to provide a variable monitoring system with means for minimizing false alarms due to factors other than switching transients, such as spurious noise or other false alarm causing factors.

In accordance with a broad aspect of the present invention, the controller, which is to be ultimately responsive to an abnormal condition of the variable (the controller, for example, comprising a circuit for shutting down the equipment being monitored or connecting measuring and recording apparatus to the transducer being scanned), is disabled from operation even during the initial detection of an abnormal variable, until a recheck of the condition of the variable involved is carried out to determine whether the variable was really abnormal. The condition of the variable can be rechecked in a number of ways in accordance with the broadest aspect of the present invention, although, in the embodiment to be described, the recheck is a limited recheck operation as will be explained. The recheck operation is preferably but not necessarily carried out after a sufficient time delay has elapsed which enables, for example, switching transients to decay substantially to zero. This recheck could be made upon the same signal initially checked or a different signal or variable related to the variable actually being monitored, such as the output of another transducer responsive to the same variable or a related variable. An important feature of the recheck operation is that it is only carried out when an initial check of the variable indicates an abnormal variable condition. In the preferred embodiment of the invention, where the scanning rate is so high that switching transients may be normally significant at the end of a normal switching period, the recheck operation requires the temporary stoppage of the scanning switch. This, however, need not substantially affect the overall high speed scanning rate of the system where an initial abnormal condition occurs infrequently.

In accordance with another aspect of the present invention, in order to minimize the number of false initial abnormal conditions detected, the portion of the circuit which effects the stoppage of the scanning switch is gated so as to be operative only near the end of a normal switching period where switching transients have decayed substantially, but not substantially to zero. Then, if the variable is still apparently abnormal during the end of the normal switching period, the scanning switch is stopped and a recheck operation performed after a short time delay to allow the switching transients to decay substantially to zero.

The aforementioned recheck operation is useful, even in the absence of switching transients, where the initial sensing of an abnormal variable is due to a spurious noise pulse caused, for example, by the turning on of a nearby piece of electrical equipment. Normally, the probability of a significant spurious noise pulse occurring during the initial checking operation is small, so that the probability of the existence of such a pulse during a recheck operation is substantially more unlikely.

Some of the other aspects of the invention relate to the inclusion of a visual annunciator for indicating initial alarm conditions and to the specific arrangements and design of the components by means of which the broader aspects of the invention are carried out. These, together with other objects and advantages of the invention, will become apparent upon making reference to the specification to follow, the claims and the drawings wherein:

Figure 1:
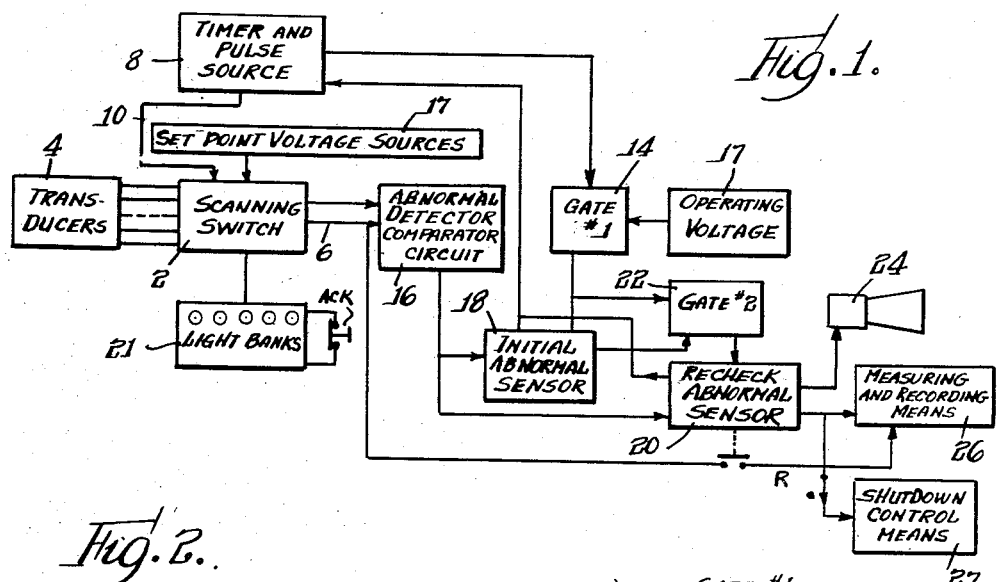
Fig. 1 is a simplified box diagram of a preferred form of variable monitoring system incorporating features of the present invention which minimize false alarms due to spurious noise pulses and switching transients.
Figure 2:
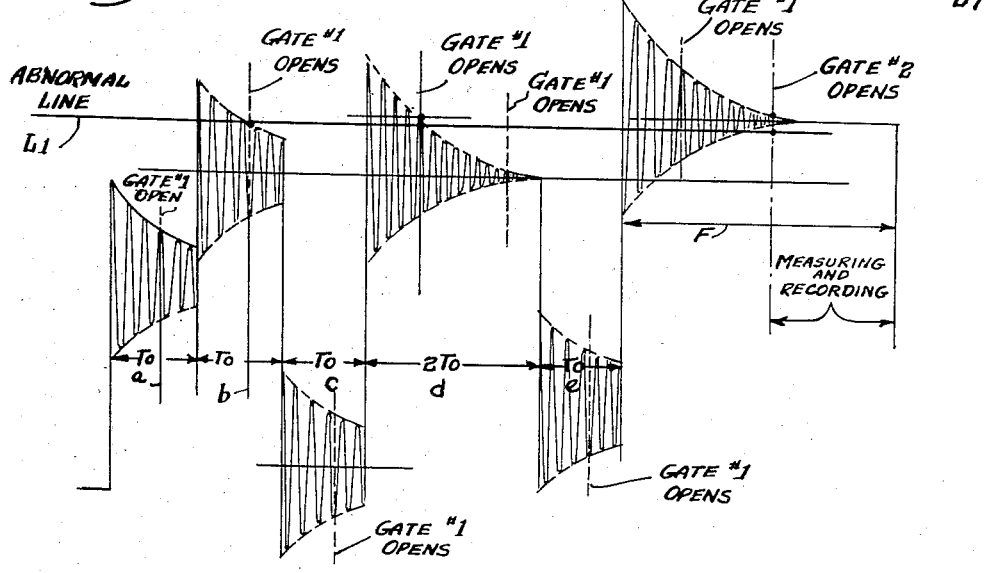
Fig. 2 is a figure showing the waveform of the output of the scanning switch showing the effect of switching transients and the manner in which the present invention modifies the scanning rate when initial check and recheck conditions prevail.
Figure 3:
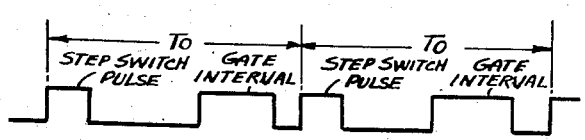
Fig. 3 is a timing diagram showing the relative positions of the switching pulses controlling operation of the scanning switch and the gating intervals during which certain control gates are open.

Referring now more particularly to Figs. 1 through 3, the variable monitoring system there shown includes a scanning switch 2 which sequentially couples the outputs of signal input transducers 4, which may be thermocouples, bellow-operated pressure-responsive or flow potentiometers or the like, to the output of the scanning switch indicated by line 6. The scanning switch may be a telephone type of stepping switch having an operating solenoid which advances the wiper one position each time it is pulsed. A pulse source 8 is provided which generates switching pulses at a high rate, which pulses, under normal conditions, appear on an output line 10 extending to the scanning switch. Pulse source 8 is part of a timer which, in the preferred form of the invention, operates a gate 14 which may be a set of contacts which are closed for an interval spaced from each switching pulse an amount permitting a substantial decay of switching transients (shown in Fig. 2) before the contacts are closed. The closing of the gating contacts renders an initial abnormal condition sensor circuit 18 responsive to the output of a condition checking means which may be a detector comparator circuit 16 connected to the output 6 of the scanning switch 2. The detector comparator circuit is preferably continuously operative and it compares the signal voltage from the scanning switch 2 with the outputs of preset voltage sources 17 to determine if the upper and/or lower alarm limits of the variable involved have been exceeded. The operation of gate 14 may itself create transient voltages, but the nature of the circuit is such that these voltages don't affect the operation of the continuously operating detector 16 and the operation of the initial abnormal condition sensor circuit 18.

In Fig. 2, the steep vertical lines represent the beginning of a scanning switch operation, that is, for example, the movement of the wiper of a stepping switch to the next stationary contact, which couples a new transducer to the detector 16. Due to the nature of electrical circuits, a sudden change in the magnitude of the voltage on the output line 6 may generate switching transients in the form of exponentially decaying oscillations centered about a median voltage value representing the direct current voltage output of one of the transducers 4. The line L1 in Fig. 2 represents a voltage level indicating an abnormal variable, it being assumed in the example that the transducer outputs illustrated in Fig. 2 are associated with similar variables having the same alarm limit. The various periods $a$, $b$, $c$, $d$, $e$ and $f$ represent successive switching periods, that is, periods during which different transducers are connected to the output of the scanning switch 2. The vertical dotted line spaced from the beginning of each of the switching periods represents the moment at which gate 14 is opened, which moment occurs after the switching transients have decayed substantially although far from zero. Note that only in switching periods $b$, $d$ and $f$, do the initial magnitudes of the signals at the output of the scanning switch 2 exceed the abnormal limit level L1. In the case of switching period $b$ note that the maximum magnitude of the signal at the output of the scanning switch has gone below the level L1 when gate 14 is open.

Returning to a description of Fig. 1, a source of operating voltage 17 is coupled to the initial abnormal condition sensor circuit 18 during the gating period when the gate 14 is open to render the same operative. Assuming the signal voltage of period $b$, although the detector 16 at the beginning of the switching period detects an abnormal variable, the initial abnormal condition sensor circuit 18 connected to the detector output would not indicate an abnormal variable because it is not then operative. When it is rendered operative upon the opening of gate 14, the sensor circuit 18 coupled to the detector circuit indicates a normal variable because the transients have decayed to a point where the resultant signal voltage goes below the abnormal limit line L1. As long as the initial abnormal condition sensor circuit 18 indicates a normal condition of the variable, the next switching pulse generated by pulse source 8 will be fed to the scanning switch 2 to initiate a switching operation which connects the next transducer to the detector 16. Thus far, the normal high scanning rate of the system has not been disturbed even though initially the signal at the output of the scanning switch went beyond the abnormal limit due to the presence of switching transients.

Consider now the switching period $d$ in Fig. 2 wherein the actual value of the variable involved is also normal but wherein the output of the scanning switch indicates an abnormal value even when gate 14 is opened because the switching transients, which are then still significant, bring the resultant voltage above abnormal limit line L1. A recheck abnormal condition sensor circuit 20 is provided which, in the most preferred form of the invention, is connected to the operating voltage source 17 through the aforementioned gate 14 and also through a gate 22 in series with gate 14. The recheck sensor circuit 20, when armed for operation, is responsive to the detection of an abnormal variable condition by the detector 16. The recheck sensor circuit is armed for operation by the opening of gate 22. Gate 22 is opened only following the sensing of an apparently abnormal variable by the initial abnormal condition sensor circuit 18 and remains open until the end of the switching period. The initial abnormal condition sensor circuit 18 is provided with means for gating or otherwise preventing the coupling of a switching pulse from pulse source 8 to scanning switch 2 when it senses an apparently abnormal variable, so that the switching period involved is prolonged beyond the normal switching period. In the example illustrated in Fig. 2, the switching period $d$ is double the normal period $a$. Also, when an initial abnormal condition of the variable is sensed by the initial abnormal condition sensor circuit 18, the latter in conjunction with a level of the scanning switch 2 lights an alarm light in a bank of lamps 21 which identifies the apparently abnormal variable involved.

The timer and pulse source 8 opens the gate 14 at a regular rate, indicated in Fig. 3, independently of the abnormal or normal condition of the variable being scanned. The recheck abnormal condition sensor circuit 20 is thus rendered operative during the switching period $d$ in Fig. 2 when the gate 14 is opened for the second time during the prolonged switching period involved, since gate 22 was previously opened when sensor circuit 18 responded to the apparently abnormal condition of the scanned variable. Thus, when gate 14 is opened for the second time in period $d$, the opening voltage source 17 is connected to the recheck sensor circuit 20 through gates 14 and 22 to render the latter sensor circuit operative since, in the example, the detector 16 still indicates an abnormal variable. Operation of the recheck sensor circuit 20, which is the main or ultimate controller of the monitoring system, operates suitable alarm apparatus, such as a horn 24 and, for example, connects measuring and recording means 26 to the output of the transducer being scanned so as to record the value of the variable scanned, and/or operates devices which can take either corrective action to return the variable to normal or shut down the equipment being monitored.

In the preferred monitoring system, the timing is such that the switching transients have substantially decayed to zero by the time the gate 14 is opened for the second time during the prolonged switching period $d$. Therefore, the condition of the variable detected by the recheck sensor circuit 20 represents the condition of the variable unaffected to any significant degree by switching transients or, most probably, spurious noise pulses. In the case illustrated by switching period $d$, the recheck sensor circuit 20 is not operated because the detector 16 indicates a normal variable by the time the gate 14 is opened the second time. Under these circumstances, the system is reset so that a new switching period is initiated.

In the example illustrated by switching period $f$ in Fig. 2, an abnormal variable is involved so that the transducer output is abnormal the first time gate 14 is opened and also the second time gate 14 is opened, so that the recheck sensor circuit 20 will indicate an abnormal value. Horn 24 and the measuring and recording means 26 will then be operated.

Since, in the example illustrated, no buffer storage for the abnormal signals is provided, it is necessary to prevent the advancement of the scanning switch 2 until completion of the measuring or recording operation. When this is completed, a complete signal initiated by the measuring and recording means renders the pulse source 8 operative once again, so that a pulse appears at output 10 of the scanning switch 2 to initiate further operation, unless shutdown is desired.

In certain types of installations, it may be desirable to shut down the equipment being monitored when a new abnormal variable is detected. Accordingly, the recheck abnormal condition sensor circuit 20 may control the above mentioned shutdown control means 27. This may necessitate the stopping of the scanning switch 2, in which case, the measuring and recording means 26 may be of no value except, perhaps, to record the value of the abnormality before the equipment is shut down.

It should be understood that although the particular arrangement of elements in Fig. 1 is preferred, the broader aspects of the invention are not to be limited to it since the functions of numerous elements can be combined and/or the functions of certain elements therein split up into separate elements. Also, the functions performed during recheck can be changed or modified, for example, to recheck the condition of the variable scanned through indirect as well as direct means involving, for example, the checking of a related variable. An important basic concept is that means are provided for initially determining whether an apparently abnormal condition of the variable is present, and if such is the case, an ultimate control function conditioned on the presence of an abnormal variable is held in abeyance until a recheck of the condition of the variable through direct or indirect means indicates a still abnormal variable. Another important but a more limited aspect of the invention involves the prolongation of the normal switching period only when an apparently abnormal variable is detected, and the subsequent delayed recheck operation which enables a higher than normal scanning rate without false alarms due to switching transients or spurious noise pulses. Another important but limited aspect of the invention involves the additional feature where the initial abnormal conditions sensor circuit is prepared for operation after a time delay so that switching transients have a chance to decay substantially, but not substantially to zero, so that prolongation of switching periods where abnormal variables are not present is held to a reasonable minimum.

Before describing the circuit details of certain parts of the monitoring system, it may be helpful to examine one type of variable monitoring system now available on the market which has been somewhat modified in accordance with the present invention. Often, variable monitoring systems include means for detecting both high and low abnormal limits of variables. That is, variables normally are expected to fall within a certain range of values and it is important to determine when the variables fall without such ranges. Furthermore, it is desirable to detect not only the existence of a new abnormal variable but also to detect when a variable previously abnormal has just returned to normal. This is the type of system outlined in box form in Fig. 4.

Figure 4:
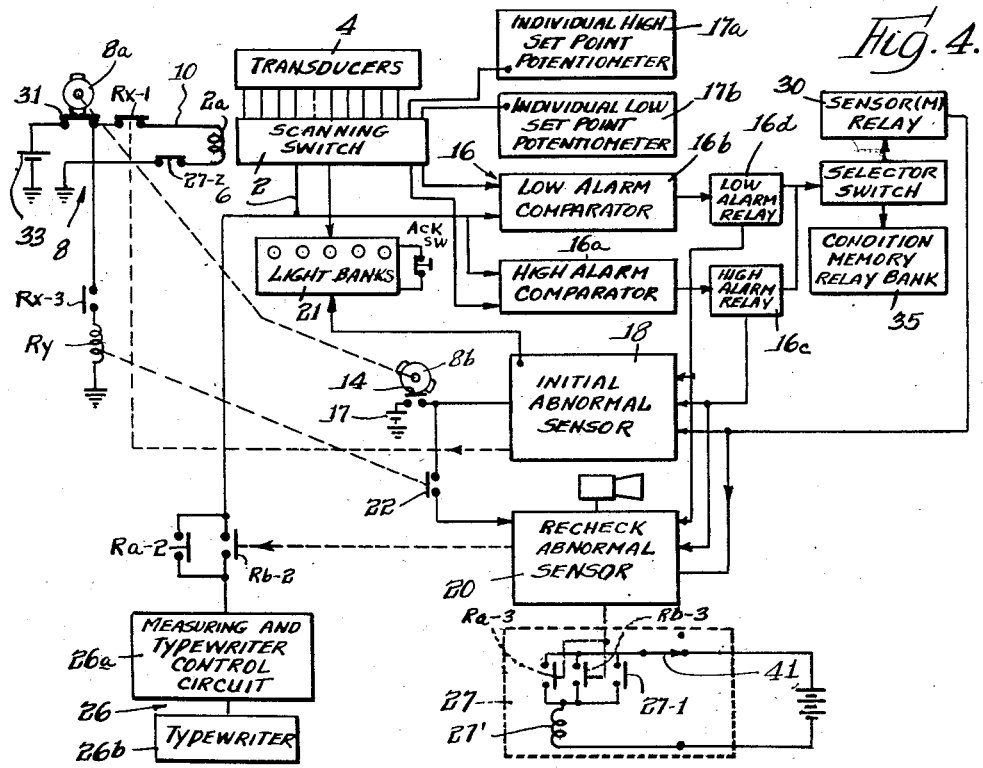
Fig. 4 is a detailed box diagram of the monitoring system shown in Fig. 1.

The elements in Fig. 4 which are common with elements in Fig. 1 have been similarly numbered. The stepping solenoid of the scanning switch 2 has been illustrated in Fig. 4 as a solenoid 2a. The timer and pulse source 8 has been indicated by cam elements 8a and 8b which respectively periodically, momentarily close a set of contacts 31, connecting a source of voltage 33 to the solenoid 2a through a set of contacts Rx–1 controlled by the initial abnormal condition sensor circuit 18. When the contacts 31 are moved from an opened to a closed position and then back to an opened position, a pulse is generated which advances the scanning switch one step, unless the contacts Rx–1 are open. The portion of the circuit referred to as preset voltage sources 17 in Fig. 1 is shown in Fig. 4 as including individual high set point potentiometers 17a and individual low set point potentiometers 17b which respectively are preset to match the high and low abnormal condition limits of the respective variables. The set point potentiometers 17a and 17b are connected through a separate level or section of the scanning switch 2 so that the high and low set point potentiometers associated with the variable being scanned are respectively connected to the inputs of a high alarm comparator circuit 16a and a low alarm comparator circuit 16b. The transducer signal of the variable being scanned is also connected to the low alarm and high alarm comparator circuits. These circuits, which are well known in the art, subtract the voltages fed thereto so that the polarity of the resultant voltage is a measure of the condition of the variable, a voltage differential above a minimum magnitude and of a certain polarity indicating an abnormal condition of the variable. The outputs of these comparator circuits respectively control a high alarm relay 16c and a low alarm relay 16d.

As above mentioned in the exemplary system shown in Fig. 4, the control portions of the monitoring system are operated only when a variable has just become abnormal or when a variable has just returned to normal. To obtain this result, a memory or storage circuit is provided which memorizes the condition of the variable during the previous scanning cycle, the circuit details for such a circuit being given in co-pending application Serial No. 470,859, filed November 24, 1954, by Ralph Arthur Anderson, on an Automatic Process Logging System. For the purposes of this disclosure, this circuit may include a bank of memory relays 35, one relay being provided for each variable, which cooperate with a selector switch 37 which is driven in synchronism with scanning switch 2. The relay being scanned is set to one state if the variable is then abnormal and to another state if it is then normal.

The energization circuit for the initial abnormal condition sensor circuit 18 is shown in Fig. 4 as including the energization voltage source 17 in series with the first set of gating contacts 14 which are periodically momentarily closed by the cam 8b leading to the circuit 18.

As explained in the above mentioned application Serial No. 470,859, the condition of the relays in the memory bank 35 are not changed to indicate the new condition of the variable being scanned until a point near the end of the switching period involved. A sensor relay 39 is connected by the selector switch 37 to the relay corresponding to the variable being scanned before the relay has been readjusted to indicate the current condition of the variable. The condition of the sensor relay, therefore, is an indication of the condition of the variable during the previous scanning cycle, and contacts of the sensor relay 39 as well as contacts of the high and low alarm relays are associated in the initial abnormal condition sensor circuit 18 so that a determination can be made whether variable involved has just become abnormal or has just returned to normal. If a new abnormal condition exists, the sensor circuit 18 prepares the second set of gating contacts 22 for closing when the contacts 31 next close and operates a lamp in the bank of lamps 21 which identifies the variable being scanned. A relay Ry controlled by contacts 3 is then operated and locked in if a set of preparing contacts Rx–3 controlled by the initial abnormal condition sensor circuit are closed. The sensor circuit 18 in such case also opens contacts Rx–1 leading to the solenoid 2a to interrupt the feeding of switching pulses thereto. Consequently, the switching period is prolonged, and the next time the cam 8b closes the first set of gating contacts 14, the energization source 17 is connected to the final recheck abnormal condition sensor circuit 20 through the then closed contacts 22. The circuit 20 also includes contacts of the sensor relay 39 and the low and high alarm relays 16c and 16d so that the circuit 20 can detect whether the variable has just become normal or has just returned to normal as determined by the condition of the output of the comparator circuit 16a during the second sampling interval when the gating contacts 22 are closed. If the circuit detects an abnormal condition during such interval, it initiates the sounding of a horn 24 and closes one of the set of contacts Ra–2 or Rb–2 which connects the output of the scanning switch 2 to the measuring and recording apparatus 26. The measuring and recording means 26 as illustrated very generally in Fig. 4 records the values of new abnormal variables found to be abnormal during the recheck operation and includes measuring and typewriter control circuit 26a and a typewriter 26b. The measuring and control circuit 26a sequentially feeds control signals to the typewriter which are indicative of the decimal digits of a number corresponding to the value of the scanned variable, in addition to signals indicating the time involved and an identification of the number of the variable involved. For a more detailed disclosure of the components which would make up the measuring and control circuit 26, reference may be had to U.S. Patent No. 2,701,748, granted February 8, 1955, to Ralph Arthur Anderson on an Automatic Process Logging System and also to said application Serial No. 470,859.

The typewriter control circuit, after completion of the recording of the value of the variable and the other aforesaid information, resets the alarm sensor circuits which in turn effect the closing of contacts Rx–1 so that switching pulses are again fed to the solenoid 2a.

As above indicated, the monitoring system now being described may, in place of or in addition to a recorder, include shut-down control means 27 which, when a new abnormal variable is present during a recheck operation, shuts down the equipment being monitored. The shut-down control means 27 may include a relay 27' with contacts (not shown) arranged to de-energize the control circuit of the equipment whose variables are being monitored. This relay 27' may be connected to a source of operating potential through normally-open contacts Ra–3 or Rb–3 controlled by the recheck sensor circuit 20. The relay may have normally-open holding contacts 27–1 which bypass the last mentioned contacts for locking in the relay and normally-closed contacts 27–2 connected in series with the scanning switch solenoid 2a for disabling the scanning switch 2. If shutdown is not desired, then the shut-down control means 27 can be disabled by opening a line switch 41 connected in series with the relay 27' and the above mentioned contacts.

Figure 5:
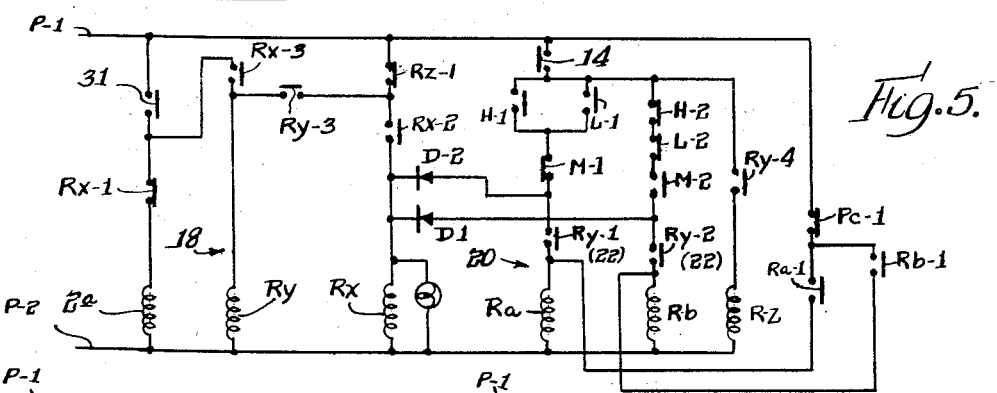
Fig. 5 is a circuit diagram of a preferred circuit for the parts of the system controlling the initiation of recheck and ultimate control functions of the monitoring system.

Reference should now be made to Fig. 5 which shows circuit details for preferred forms of the initial and recheck sensor circuits 18 and 20. In the circuit shown in Fig. 5, the two circuits are interconnected in such a manner that they cannot be completely separated, although the reference lines 18 and 20 extend generally to the sections of the circuit which perform the functions above outlined.

The initial alarm sensing circuit 18 includes a circuit extending from a direct current bus P1, through the first set of gating contacts 14 above mentioned, contacts H–1 and L–1 connected in parallel which contacts respectively close when the high and low limit relays 16e and 16f are in their abnormal indicating positions, a normally-closed set of contacts M–1 of the sensor relay 39 which are open when the sensor relay is connected with the contacts of a memory relay indicating that the variable was previously normal, and through a diode D–2 connected to an initial abnormal condition relay Rx connected to the other direct current line P2. Thus, whenever the first set of gating contacts are closed, and either the high or low limit relay is in its abnormal condition, relay Rx will be energized if the variable involved was previously normal, to indicate a new abnormal condition. If the variable had been previously normal, then the operator is already aware of the fact and it would be an unnecessary waste of time to indicate an abnormal condition again.

A similar circuit for indicating a new return to normal condition extends from the lower terminal of the gating contacts 14 and through normally-closed contacts H–2 and L–2 of the high and low limit relays which contacts are open only when the variable scanned at any instant is abnormal. These contacts are connected to normally open contacts M–2 of the sensor relay 39 which contacts are closed when the memory relay contacts to which the sensor relay is connected indicate that the variable was abnormal during the previous scanning cycle. The contacts M–2 in turn are connected to a diode D–1 leading to the relay Rx. Therefore, relay Rx will be energized if the variable scanned at any instant is normal where contacts H–2 or L–2 are closed and the variable was previously abnormal where contacts M–2 are closed, indicating that the variable has just returned to normal. The diodes D1 and D2 isolate the circuits extending through the diodes ot the relay Rx.

When the relay Rx is energized as previously indicated, its contacts Rx–1 in the input circuit to the solenoid 2a open to terminate pulsing of the solenoid 2a of the scanning switch. Also, contacts Rx–2 close in a branch extending from the upper terminal of the relay Rx through a normally closed set of contacts Rz–1 leading to power line P1. A holding circuit is thus established for the circuit Rx, which is unaffected by the pulsing of the gating contacts 14 through which the relay was initially energized. Also, contacts Rx–3 in a circuit extending from a relay Ry connected to the bus P2 and through contacts Rx–3 and gating contacts 31 connected to power line P1 close when relay Rx is energized. Relay Ry is thus momentarily energized by the next switching pulse generated by the momentary closure of the gating contacts 31. Relay Ry locks in through a set of normally-open contacts Ry–3 leading to a point between contacts Rx–2 and Rz–1. Relay Rx also has contacts to be described which control the lamps of lamp banks 21.

Energization of relay Ry closes normally-open contacts Ry–1 and Ry–2 respectively in the lines extending between contacts M–1 and M–2 and relays Ra and Rb. This prepares the latter relays for operation upon subsequent closure of the first set of gating contacts 14 during the second sampling interval within the switching period involved. Then, if the condition of the contacts H–1, L–1 and M–1 and contacts H–2, L–2 and M–2 respectively indicate a new abnormal or new return to normal conditions, respectively, relays Ra or Rb will be energized. Also, energization of relay Ry closes contacts Ry–4 in a branch extending from the bottom terminal of the gating contacts 14 to a relay Rz connected to the line P2. Before the next closure of gating contacts 14, relay Rz cannot energize through the branches including contacts H–1 and H–2, Rx–2 and Rz–1 because of the blocking effect of diodes D1 and D2. If an initial abnormal condition previously prevailed which resulted in the energization of Rx and Ry, the second closure of the gating closure 14 will energize relay Rz through the closed contacts Ry–4. When this happens, contacts Rz–1 open and the holding circuits for Rx and Ry de-energize these relays unless the relays Rx and Ry are maintained through the diodes D1 or D2, when a final new abnormal condition exists. Otherwise, the entire circuit is reset so that contacts Rx–1 close to activate the pulsing circuit for the stepping switch solenoid 2a. However, if during the second sampling of the condition of the alarm and memory contacts H–1, L–1, M–1, etc., when contacts 14 reclose, an abnormal condition is indicated, then relay Ra and Rb are energized which close contacts Ra–1 and Rb–2 in circuit between the scanning switch and the measuring and recording means 26 to initiate the recording of the value of the variable which has just become abnormal or which has just returned to normal. Relays Ra and Rb also have contacts Ra–3 and Rb–3 (Fig. 4) for controlling the shutdown control circuit when a shutdown control function is desired. Relays Ra and Rb also have contacts Ra–1 and Rb–2 which close in a circuit extending respectively from the upper terminal of relays Ra and Rb and through contacts Ra–1 and Rb–1 to a common point and through normally-closed completion contacts PC–1 leading to the line P1. In such case, relays Rx and Ry remain energized, therefore, through a circuit extending through either diode D1 or D2 through the then closed contacts Ry–1 or Ry–2 contacts, through contacts Ra–2 or Rb–2 and the contacts PC–1. The input circuit to the stepping switch solenoid, therefore, remains open since relay Rx remains energized. The circuits 18 and 20 are reset only when the recording operation is completed whereupon a print completion relay (not shown) is energized which opens contacts PC–1. This de-energizes relays Ra and Rb and also breaks the energization circuits Rx and Ry.

Figure 6:
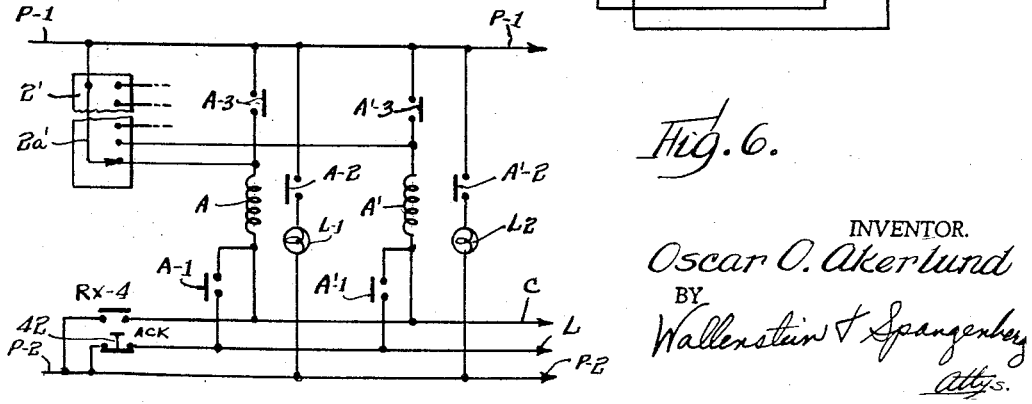
Fig. 6 shows a circuit diagram of an annunciator light system which indicates those variables requiring a recheck.

Refer now to Fig. 6 which shows the control circuitry for controlling the operation of the lamp banks 21. As above indicated, when an initial abnormal condition of a variable is detected by the initial abnormal condition sensor circuit 18, a lamp of the lamp banks 21 is lighted and locked-in which identifies the variable then being scanned. The lamp involved will stay lit even though the recheck operations indicate that the variable is actually normal, until acknowledged by operation of acknowledgment switch 42. When the recheck indicates a normal variable, the alarm light may then indicate a noisy circuit which could be caused, for example, by a defective contact on the scanning switch. The lamps are identified by the reference characters L1, L2 etc., and each is connected to a pair of power busses P–1 and P–2 through respective normally-open contacts A–2, A'–2 etc., of relays A, A' etc. The upper terminal of each of these relays is connected to a different stationary contact of a level 2' of the main scanning switch 2 so that the wiper 2a' thereof is stepped in unison with the wipers of all of the other levels of the scanning switch. The wiper 2a' is connected to the power bus P–1. The lower terminal of each of these relays is connected to a common bus C connected to the power bus P–2 through normally-open contacts Rx–4 of the relays Rx (Fig. 5) which is energized upon the initial sensing of apparently abnormal variables. It can be seen that the relays A, A' etc., are sequentially armed for operation in the same sequence and at the same time as the variables with which they are associated are being scanned by the monitoring system. Accordingly, when a variable being scanned appears to be abnormal, the consequent energization of relays Rx will energize the common bus C and energize the A relay associated with the variable. The relay involved will be locked-in through associated normally-open contacts A–1 or A'–1 to connect the bottom terminal of the relay to bus L connected to the power bus P–2 through the normally-closed, pushbutton acknowledgment switch 42. The upper terminal of the relay involved is connected directly to the other power bus P–1 through a holding contact A–3 or A'–3 etc. of the associated relay, so that the relay involved will stay energized even when the scanning switch advances to the next position. When the operator has logged the information displayed on the lamp bank 21, he depresses the acknowledgment pushbutton switch 42 to de-energize all of the energized relays A, A', etc. to extinguish the alarm lamps involved.

It should be understood that although the circuit just described is the preferred embodiment of the invention, numerous variations may be made thereof without departing from the spirit of the broader aspects of the invention.

This application is a continuation-in-part application of application Serial No. 620,332, filed November 5, 1956.

I claim as my invention:

1. Variable monitoring apparatus comprising: switching means for normally sequentially coupling signals indicative of the values of the variables to be monitored to signal responsive apparatus at a switching rate such that noise transients are still significant near the end of each normal switching period, signal responsive apparatus including abnormal condition responsive means responsive to the abnormal condition of the variables, control means for rendering said abnormal condition responsive means operative for an interval within each normal switching period at the beginning of which interval the noise transients have decayed a substantial amount but not to a point where abnormal detection errors would be insignificant, means responsive to the detection of an abnormal condition by said abnormal condition responsive means during any of said intervals for temporarily stopping the operation of said switching means to prolong the switching period involved, to enable substantially complete decaying of said noise transients, said control means being adapted to again render said abnormal condition responsive means operative for a second interval within the prolonged switching interval which second interval is spaced from said first interval therein an amount so that the noise transients have decayed to a point where abnormal detection errors due to such transients are insignificant, and means responsive to the detection of an abnormal condition by said abnormal condition responsive means only during said second interval within a prolonged switching period.

2. Variable monitoring apparatus comprising: switching means for normally sequentially coupling signals indicative of the values of the variables to be monitored to signal responsive apparatus at a switching rate such that noise transients are still significant near the end of each normal switching period, signal responsive apparatus including abnormal condition responsive means responsive to the abnormal condition of the variables, control means for rendering said abnormal condition responsive means operative for an interval within each normal switching period, means responsive to the detection of an abnormal condition by said abnormal condition responsive means during any of said intervals for temporarily stopping the operation of said switching means to prolong the switching period involved, to enable substantially complete decaying of said noise transients, said control meaans being adapted to again render said abnormal condition responsive means operative for a second interval within the prolonged switching interval which second interval is spaced from said first interval therein an amount so that the noise transients have decayed to a point where detection errors due to such transients are insignificant, and means responsive to the detection of an abnormal condition by said abnormal condition responsive means only during said second interval within a prolonged switching period.

3. Variable monitoring and recording apparatus comprising: recording apparatus for recording data on a number of variables, switching means for normally sequentially coupling signals indicative of the values of the variables to be monitored to signal responsive apparatus at a switching rate such that noise transients are still significant near the end of each normal switching period, signal responsive apparatus including abnormal condition responsive means responsive to the abnormal condition of the variables, control means for rendering said abnormal condition responsive means operative for an interval within each normal switching period, means responsive to the detection of an abnormal condition by said abnormal condition responsive means during any of said intervals for temporarily stopping the operation of said switching means to prolong the switching period involved, to enable substantially complete decaying of said noise transients, said control means being adapted to again render said abnormal condition responsive means operative for a second interval within the prolonged switching interval which second interval is spaced from said first interval therein an amount so that the noise transients have decayed to a point where detection errors due to such transients are insignificant, recorder control means for measuring said signals and for operating said recording apparatus to record the values of the measured variables, and means responsive to the detection of an abnormal condition by said abnormal condition responsive means only during said second interval within a prolonged switching period for rendering said recorder control means operative to record data on the variable having an abnormal value.

4. Variable monitoring and recording apparatus comprising: recording apparatus for recording data on a number of variables, switching means for normally sequentially coupling signals indicative of the values of respective variables to be monitored to signal responsive apparatus at a switching rate such that noise transients are still significant near the end of each normal switching period, signal responsive apparatus including abnormal condition responsive means responsive to the abnormal condition of the variables, control means for rendering said abnormal condition responsive means operative for an interval within each normal switching period at the beginning of which interval the noise transients have decayed a substantial amount but not a point where alarm detection errors would be insignificant, means responsive to the detection of an abnormal condition by said abnormal condition responsive means during any of said intervals for temporarily stopping the operation of said switching means to prolong the switching period involved, to enable substantially complete decaying of said noise transients, said control means being adapted to again render said abnormal condition responsive means operative for a second interval within the prolonged switching interval which second interval is spaced from said first interval therein an amount so that the noise transients have decayed to a point where detection errors due to such transients are insignificant, recorder control means for measuring said signals and for operating said recording apparatus to record the values of the measured variables, means responsive to the detection of an abnormal condition by said abnormal condition responsive means only during said second interval within a prolonged switching period for rendering said recorder control means operative to record data on the variable having an abnormal value, and means for terminating the prolonged switching periods to initiate normal relatively high speed switching following completion of the recording of said data.

5. Variable monitoring apparatus comprising: an abnormal variable detector for sensing the abnormal condition of variables, scanning switch means for normally continuously sequentially coupling signals indicative of the variable conditions to said detector at a normal switching rate, initial abnormal condition sensing means responsive to an abnormal variable value detected by said detector for temporarily stopping said switching means, normally inoperative recheck abnormal condition sensing means responsive to said detector, means responsive to the sensing of an abnormal condition of the scanned variable by said initial abnormal condition sensing means for rendering said recheck abnormal condition sensing means operative after a delay and before the scanning means advances to the next position, and control means responsive to the sensing of an abnormal variable by said recheck abnormal condition sensing means.

6. Variable monitoring apparatus comprising: an electrical abnormal variable detector for sensing the abnormal condition of variables, scanning switch means for normally continuously sequentially coupling signals indicative of the variable conditions to said detector at a normal switching rate, initial abnormal variable sensing means responsive to an abnormal variable detected by said detector for temporarily stopping said switching means, control means for rendering said initial abnormal variable sensing means non-responsive to an abnormal condition of the scanned variables for an interval at the beginning of each of said periods, the initial abnormal sensing means being operative at the end of each such interval, normally inoperative recheck abnormal variable sensing means responsive to said detector, means responsive to the sensing of an abnormal condition of the scanned variable by said initial abnormal variable sensing means for rendering said recheck abnormal variable sensing means operative after a delay and during an interval in the prolonged switching period, and control means responsive to the sensing of an abnormal variable by said recheck abnormal condition sensing means.

7. Variable monitoring and recording apparatus comprising: an electrical abnormal variable detector for sensing the abnormal condition of variables as determined by signals derived from electrical transducers, scanning switch means for normally continuously sequentially coupling the outputs of the transducers to said detector at a normal switching rate wherein the period between successive switching operations is less than the period required for switching transients to decay substantially to zero, initial abnormal condition sensing means responsive to an abnormal variable value detected by said detector for temporarily stopping said switching means to enable switching transients to decay substantially to zero, normally inoperative recheck abnormal condition sensing means responsive to said detector, means responsive to the sensing of an abnormal variable by said initial abnormal variable sensing means for rendering said recheck abnormal condition sensing means operative only during an interval in a prolonged switching period beginning at a time when the switching transients have decayed substantially to zero, means responsive to the detection of an abnormal variable by said recheck abnormal condition sensing means for maintaining the cessation of operation of the switching means, recording means responsive to the sensing of an abnormal variable by said recheck abnormal condition sensing means, and means responsive to completion of the operation of said recording means for initiating continued normal high speed operation of said switching means.

8. Variable monitoring and recording apparatus comprising: an electrical abnormal condition detector for sensing the abnormal condition of variables, scanning switch means for normally continuously sequentially coupling signals indicative of the variable values to said detector at a normal switching rate wherein the period between successive switching operations is less than the period required for switching transients to decay substantially to zero, initial abnormal condition sensing means responsive to an abnormal variable value detected by said detector for temporarily stopping said switching means to enable switching transients to decay substantially to zero, normally inoperative recheck abnormal condition sensing means responsive to said detector, means responsive to the sensing of an abnormal value of the scanned variable by said initial abnormal condition sensing means for rendering said recheck abnormal condition sensing means operative after a time delay and before the scanning switch means advances to the next position, and measuring and recording means rendered operative by the sensing of an abnormal value of the scanned variable by said recheck abnormal condition sensing means for measuring and recording the value of the scanned variable indicated by said signals.

9. Variable monitoring apparatus comprising: switching means for normally sequentially coupling signals indicative of the values of variables to be monitored to signal responsive apparatus, abnormal condition detecting means responsive to the output of said switching means for detecting abnormal values of the variables, initial abnormal condition sensing means responsive to the output of said detecting means, a source of operating voltage for said initial abnormal condition sensing means, gating means between said source of operating voltage and said initial abnormal condition sensing means for gating the operating voltage to the latter means, pulse source means for producing a first series of pulses for initiating operation of said switching means and a second series of pulses spaced from said switching pulses for opening said gating means for respective intervals, recheck abnormal condition sensing means, second gating means connecting the output of said first gating means to said recheck abnormal condition sensing means for connecting operating voltage thereto when said first and second gating means are open, means responsive to the detection of an abnormal variable by said initial abnormal condition sensing means for stopping the feeding of pulses from said pulse source means to said switching means and for opening said second gating means when a pulse of said first series of pulses is generated, said recheck abnormal condition sensing means being operative when said first gating means is opened for the second time and control means responsive to the detection of an abnormal value of the scanned variable by said recheck abnormal condition sensing means.

10. Variable monitoring apparatus comprising respective condition responsive means responsive to the conditions of variables to be monitored, condition checking means responsive to said condition responsive means for checking the condition of said variables, scanning means for sequentially connecting said condition checking means to said condition responsive means, means responsive to the detection of an apparently abnormal condition of the scanned variable by said condition checking means for temporarily stopping the operation of said scanning means and effecting the rechecking of the condition of the variable involved, and control means responsive to the detection of an abnormal condition of said latter variable only during the recheck operations.

11. Variable monitoring apparatus comprising respective condition responsive means responsive to the condition of variables to be monitored, condition checking means responsive to said condition responsive means for checking the condition of said variables, scanning means for sequentially connecting said condition checking means to said condition responsive means, respective visual indicators for indicating the apparent alarm condition of said respective variables, means responsive to the detection of an apparently abnormal condition of the scanned variable by said condition checking means for temporarily stopping the operation of said scanning means, operating the visual indicator associated with the variable being scanned and effecting the rechecking of the condition of the variable involved, and control means responsive to the detection of an abnormal condition of said latter variable only during the recheck operation.

12. Variable monitoring apparatus comprising respective condition responsive means responsive to the condition of variables associated with given operating apparatus to be monitored, condition checking means responsive to said condition responsive means for checking the condition of said variables, scanning means for sequentially connecting said condition checking means to said condition responsive means, means responsive to the detection of an apparently abnormal condition of the scanned variable by said condition checking means for temporarily stopping the operation of said scanning means and effecting the rechecking of the condition of the variable involved, and control means responsive to the detection of an abnormal condition of said latter variable only during the recheck operation for shutting down said apparatus to be monitored.

13. Variable monitoring apparatus comprising respective condition responsive means responsive to the conditions of variables associated with given operating apparatus to be monitored, condition checking means responsive to said condition responsive means for checking the condition of said variables, scanning means for sequentially connecting said condition checking means to said condition responsive means, respective visual indicators for indicating the apparent alarm condition of said respective variables, means responsive to the detection of an apparently abnormal condition of the scanned variable by said condition checking means for temporarily stopping the operation of said scanning means, operating the visual indicator associated with the variable being scanned and effecting the rechecking of the condition of the variable involved, and control means responsive to the detection of an abnormal condition of said latter variable only during the recheck operations for shutting down said apparatus to be monitored.

14. Variable monitoring apparatus comprising: signal input means providing signals which are functions of the values of respective variables to be monitored, switching means for sequentially coupling said signals respectively to signal responsive apparatus, signal responsive apparatus to which said signals are coupled including abnormal variable sensing means responsive to an abnormal condition of the variables, means for normally rendering said abnormal variable sensing means operative for a first interval within each switching period, means responsive to the initial response of said abnormal variable sensing means to an abnormal variable by rendering said abnormal variable sensing means operative for a second interval spaced from the first interval and occurring before the switching means scans the next of said variables, and control means responsive only during the second interval to said abnormal variable sensing means.

15. In a variable monitoring system, signal input means providing a signal which is a function of the value of a variable to be monitored, first means operated by said signal when it indicates an abnormal condition of said variable, second means responsive to an abnormal conditions of said variable when armed for operation, said first means including means responsive to an abnormal condition indicating signal of said signal input means by arming said second means for operation, and control means operated when said second means responds to an abnormal condition of the variable.

16. In a signal monitoring system respective signal input means providing signals which are functions of the values of respective variables, scanning switch means for sequentially scanning the signals of said respective signal input means, first means for comparing the signal scanned by said scanning switch means with a predetermined value, second means operated when the variable value indicated by said signal and said predetermined value reaches a predetermined state of comparison, and normally inoperative third means responsive to a given condition of the variable being scanned only when armed for operation, said second means, when operated, stopping said scanning means and arming said third means for operation, and control means operated by said third means when the latter indicates that the variable involved is in said given condition.

17. Variable monitoring apparatus comprising: an abnormal variable detector for sensing the abnormal condition of variables, scanning switch means for normally continuously sequentially coupling signals indicative of the variable conditions to said detector, initial abnormal condition sensing means responsive to an abnormal variable value detected by said detector, normally inoperative recheck abnormal condition sensing means responsive to said detector, means responsive to the sensing of an abnormal condition of the scanned variable by said initial abnormal condition sensing means for rendering said recheck abnormal condition sensing means operative after a delay and before the scanning means advances to the next position, and control means responsive to the sensing of an abnormal variably by said recheck abnormal condition sensing means.

18. Variable monitoring and recording apparatus comprising: an electrical abnormal condition detector for sensing the abnormal condition of variables, scanning switch means for normally continuously sequentially coupling signals indicative of the variable values to said detector at a normal switching rate, initial abnormal condition sensing means responsive to an abnormal variable value detected by said detector, normally inoperative recheck abnormal condition sensing means responsive to said detector, means responsive to the sensing of an abnormal value of the scanned variable by said abnormal condition sensing means for rendering said recheck abnormal condition sensing means operative, and measuring and recording means rendered operative by the sensing of an abnormal value of the scanned variable by said recheck abnormal condition sensing means for measuring and recording the value of the scanned variables indicated by said signals.

No references cited.